(12) United States Patent
Ozawa

(10) Patent No.: US 9,781,166 B2
(45) Date of Patent: Oct. 3, 2017

(54) GATEWAY DEVICE, SYSTEM, AND COMMUNICATION METHOD

(75) Inventor: Kazunori Ozawa, Tokyo (JP)

(73) Assignee: RAKUTEN, INC., Tokyo (JP)

( * ) Notice: Subject to any disclaimer, the term of this patent is extended or adjusted under 35 U.S.C. 154(b) by 575 days.

(21) Appl. No.: 12/810,171

(22) PCT Filed: Jan. 15, 2009

(86) PCT No.: PCT/JP2009/050431
§ 371 (c)(1),
(2), (4) Date: Jun. 23, 2010

(87) PCT Pub. No.: WO2009/090983
PCT Pub. Date: Jul. 23, 2009

(65) Prior Publication Data
US 2010/0272023 A1    Oct. 28, 2010

(30) Foreign Application Priority Data

Jan. 16, 2008    (JP) .................................. 2008-006889

(51) Int. Cl.
*H04L 12/66*    (2006.01)
*H04L 29/06*    (2006.01)
(Continued)

(52) U.S. Cl.
CPC .......... *H04L 65/1016* (2013.01); *H04L 12/66* (2013.01); *H04L 65/102* (2013.01);
(Continued)

(58) Field of Classification Search
CPC ......... H04L 12/66; H04L 69/08; H04L 47/10; H04W 88/16; H04W 92/02; H04W 28/10;
(Continued)

(56) References Cited

U.S. PATENT DOCUMENTS

2003/0026245 A1    2/2003  Ejzak
2005/0201336 A1*   9/2005  Lee ............................... 370/335
(Continued)

FOREIGN PATENT DOCUMENTS

JP     58-215151 A     12/1983
JP     2002185554 A    6/2002
(Continued)

OTHER PUBLICATIONS

RFC 4867, Apr. 10, 2007.*
(Continued)

*Primary Examiner* — Faruk Hamza
*Assistant Examiner* — Axia Guadalupe-Cruz
(74) *Attorney, Agent, or Firm* — Hubbs, Enatsky & Inoue PLLC

(57) ABSTRACT

A gateway device includes a communication unit communicating a frame signal conforming to an IuUP (Iu User Plane) protocol with a wireless base station controller connected to a circuit switching network; a determination unit determining whether the frame signal received by the communication unit satisfies a predetermined condition or not; a conversion unit converting information included in the frame signal to information to be set in a flow control signal of an IMS (IP Multimedia Subsystem) when the frame signal satisfies the predetermined condition; and a flow control signal transmission unit transmitting the flow control signal to a communication device in the IMS.

16 Claims, 5 Drawing Sheets

(51) Int. Cl.
*H04W 76/02* (2009.01)
*H04W 88/16* (2009.01)
*H04W 88/12* (2009.01)
*H04W 84/04* (2009.01)
*H04W 92/02* (2009.01)

(52) U.S. Cl.
CPC .......... *H04L 65/103* (2013.01); *H04L 65/104* (2013.01); *H04L 65/1033* (2013.01); *H04L 69/08* (2013.01); *H04W 76/026* (2013.01); *H04W 84/045* (2013.01); *H04W 88/12* (2013.01); *H04W 88/16* (2013.01); *H04W 92/02* (2013.01)

(58) Field of Classification Search
CPC ............ H04M 7/123; H04M 2207/187; H04N 21/234309; H04N 21/6125; H04Q 2213/13204; H04Q 2213/13248
See application file for complete search history.

(56) References Cited

U.S. PATENT DOCUMENTS

| | | | |
|---|---|---|---|
| 2005/0213546 A1* | 9/2005 | Reitter et al. ................. | 370/338 |
| 2007/0025301 A1* | 2/2007 | Petersson et al. ............ | 370/338 |
| 2007/0041320 A1* | 2/2007 | Chen ................... | H04W 88/181 |
| | | | 370/235 |
| 2007/0053343 A1 | 3/2007 | Suotula et al. | |
| 2007/0140293 A1* | 6/2007 | Agarwal ................. | H04L 12/66 |
| | | | 370/466 |
| 2008/0198874 A1* | 8/2008 | Matsushima ......... | H04L 65/103 |
| | | | 370/466 |
| 2009/0109893 A1* | 4/2009 | Gopal .................... | H04L 65/80 |
| | | | 370/315 |

FOREIGN PATENT DOCUMENTS

| | | |
|---|---|---|
| JP | 2002354144 A | 12/2002 |
| JP | 2003198638 A | 7/2003 |
| JP | 2006527940 A | 12/2006 |
| JP | 2007037884 A | 2/2007 |
| JP | 2008205698 A | 9/2008 |
| WO | 2007040085 A | 4/2007 |

OTHER PUBLICATIONS

International Search Report for PCT/JP2009/050431 mailed Apr. 14, 2009.

3rd Generation Partnership Project, "3GPP TS 23.002 v7.1.0", pp. 36-38, Figure 6, issued in Mar. 2006, http://www.3gpp.org/ftp/Specs/html-info/23002.htm, searched on the Internet on Dec. 27, 2007.

3rd Generation Partnership Project, "3GPP TS 29.163 v8.0.0", pp. 88-89, Figure 32, issued in Sep. 2007, http://www.3gpp.org/ftp/Specs/html-info/29163.htm, searched on the Internet on Dec. 27, 2007.

3rd Generation Partnership Project. "3GPP TS 26,090 v5.0.0", pp. 13-15, Table 1, issued in Jun. 2002, http://www.3gpp.org/ftp/Specs/html-info/26090.htm, searched on the Internet on Dec. 27, 2007.

3rd Generation Partnership Project, "3GPP TS 25.415 v7.3.0", pp. 11-13, Figure 3, issued in Dec. 2006, http://www.3gpp.org/ftp/Specs/html-info/25415.htm, searched on the Internet on Dec. 27, 2007.

AGMSC (advanced Gateway Mobile-services Switching Centre), [online], [retrieval date Apr. 2, 2009 (Apr. 2, 2009)], NEC Corp., Apr. 2007, Internet<URL:http://www.nec.co.jp/products/ngnsl/products/agmsc/pdf/agmsc.pdf>.

H. Schulzrinne et al., "RTP: A Transport Protocol for Real-Time Applications", IETF Audio-Video Transport Working Group, Network Working Group, Request for Comments: 1889, Section 6.6, pp. 37-38, Jan. 1996.

Japanese Office Action for JP2009-550032 mailed on Jun. 7, 2012.

Kensuke Matsushima and three persons, "Development of MGW device for NGN/IMS", the 2007 Institute of Electronics, Information and Communication Engineers, the Institute of Electronics, Information and Communication Engineers (Incorporated association), Mar. 7, 2007, B-6-89, p. 89.

The Extended European Search Report for EP Application No. 09701541.6 dated on Nov. 28, 2013.

* cited by examiner

GATEWAY DEVICE, SYSTEM, AND COMMUNICATION METHOD

This application is the National Phase of PCT/JP2009/050431, filed Jan. 15, 2009, which is based upon and claims the benefit of priority from Japanese patent application No. 2008-006889, filed on Jan. 16, 2008, the disclosure of which is incorporated herein in its entirety by reference.

TECHNICAL FIELD

The present invention relates to a gateway device for realizing multimedia services such as voice service and TV telephone by connecting a radio network controller (RNC) and a fixed network or an IMS (IP Multimedia Subsystem) core network in a cellular phone network.

BACKGROUND ART

In a cellular phone terminal and a cellular phone network using the third-generation W-CDMA technique, a circuit switching network or a circuit switching protocol is used in order to realize a voice telephone and a TV telephone.

In the meantime, there is a trend toward providing multimedia service on such a circuit switching network by using an IMS on an IP network. In the future, various services are going to be integrated on an IMS core network. The configuration of an IMS is described in, for example, non-patent document 1, which is described below and TS23.228 specified by 3GPP (3rd Generation Partnership Project).

CITATION LIST

Patent Literature

{NPL 1} 3rd Generation Partnership Project, "3GPP TS 23.002 v7.1.0" pp. 36 to 38, FIG. 6, issued in March 2006, http://www.3gpp.org/ftp/Specs/html-info/23002.htm, searched on the Internet on Dec. 27, 2007
{NPL 2} 3rd Generation Partnership Project, "3GPP TS 29.163 v8.0.0" pp. 88 to 89, FIG. 32, issued in September 2007, http://www.3gpp.org/ftp/Specs/html-info/29163.htm, searched on the Internet on Dec. 27, 2007
{NPL 3} 3rd Generation Partnership Project, "3GPP TS 26.090 v5.0.0" pp. 13 to 15, Table 1, issued in June 2002, http://www.3gpp.org/ftp/Specs/html-info/26090.htm, searched on the Internet on Dec. 27, 2007
{NPL 4} 3rd Generation Partnership Project, "3GPP TS 25.415 v7.3.0" pp. 11 to 13, FIG. 3, issued in December 2006, http://www.3gpp.org/ftp/Specs/html-info/25415.htm, searched on the Internet on Dec. 27, 2007
{NPL 5} IETF Audio-Video Transport Working Group, "Request For Comment (RFC) 1889", pp. 37 to 38, Section 6.6, issued in January 2006, ftp://ftp.rfc-editor.org/in-notes/rfc1889.txt, searched on the Internet on Dec. 28, 2007

SUMMARY OF INVENTION

Technical Problem

When providing multimedia service on a circuit switching network by using an IMS, an IMS core network has to be connected to the circuit switching network. In this case, a communication protocol of flow control used on the IMS is different from that on the circuit switching network. Therefore, even when a frame signal of a multimedia service is supplied from the circuit switching network to the IMS, the IMS cannot properly perform the flow control.

The present invention has been achieved in view of the drawbacks and an object of the invention is to provide a gateway device for performing flow control of a frame signal supplied from a circuit switching network to an IMS core network.

Solution to Problem

A gateway device of the present invention includes: a communication unit communicating a frame signal conforming to an IuUP (Iu User Plane) protocol with a wireless base station controller connected to a circuit switching network; a determination unit determining whether the frame signal received by the communication unit satisfies a predetermined condition or not; a conversion unit converting information included in the frame signal to information to be set in a flow control signal of an IMS (IP Multimedia Subsystem) when the frame signal satisfies the predetermined condition; and a flow control signal transmission unit transmitting the flow control signal including the converted information to a communication device in the IMS.

A system of the present invention includes a gateway device and a flow controller which are communicatably connected to each other. The gateway device includes: a first communication unit communicating a frame signal conforming to an IuUP (Iu User Plane) protocol with a wireless base station controller connected to a circuit switching network; a determination unit determining whether the frame signal received by the first communication unit satisfies a predetermined condition or not; a conversion unit converting information included in the frame signal to information to be set in a flow control signal of an IMS (IP Multimedia Subsystem) when the frame signal satisfies the predetermined condition; and a second communication unit transmitting the information converted by the conversion unit to the flow controller, and the flow controller comprises a flow control signal transmission unit transmitting the flow control signal including the information received from the gateway device to a communication device in the IMS.

A communication method of the present invention includes the steps of receiving a frame signal conforming to an IuUP (Iu User Plane) protocol from a wireless base station controller connected to a circuit switching network; determining whether the frame signal satisfies a predetermined condition or not; converting information included in the frame signal to information to be set in a flow control signal of an IMS (IP Multimedia Subsystem) when the frame signal satisfies the predetermined condition; and transmitting the flow control signal including the converted information to a communication device in the IMS.

ADVANTAGEOUS EFFECTS OF INVENTION

According to the present invention, a flow control adapted to the IMS can be performed on a frame signal supplied from a circuit switching network to the IMS. Thus, multimedia service in the circuit switching network can be provided in a proper state to the IMS.

Figure 1:
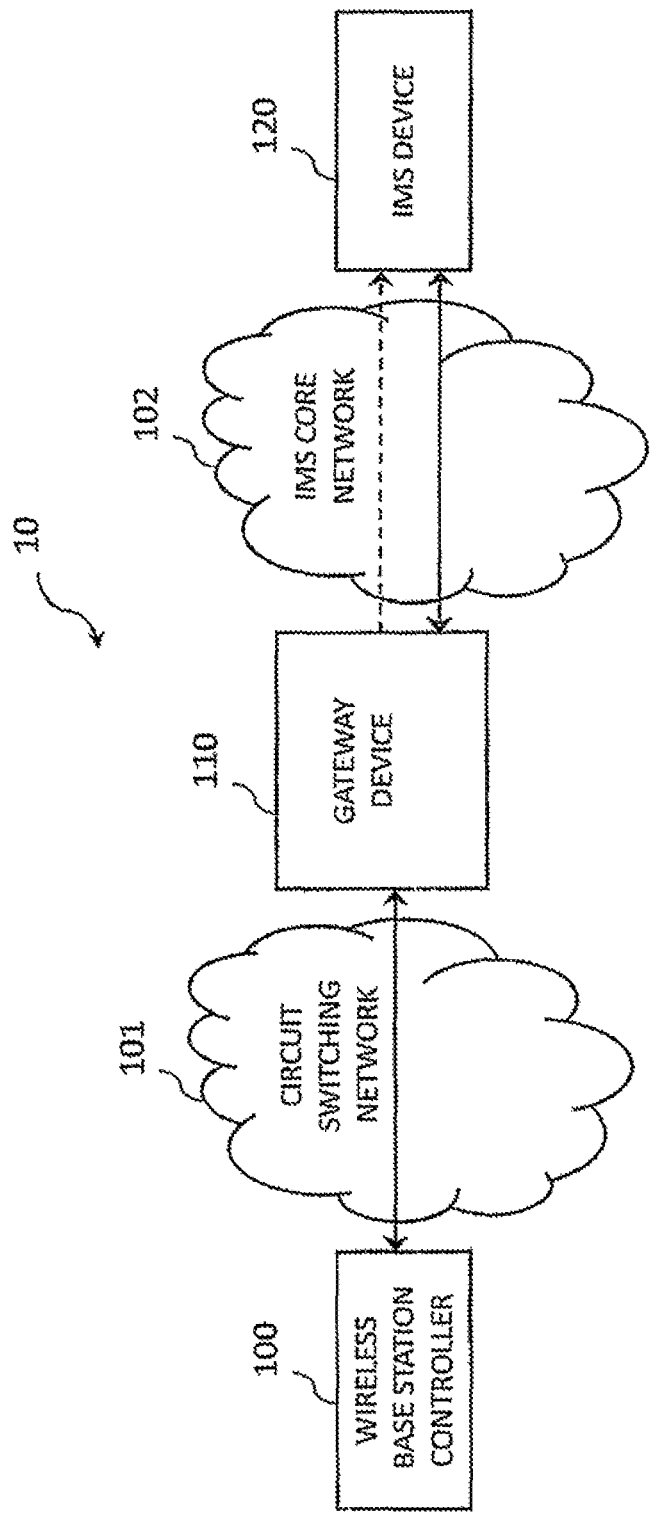
FIG. 1 is a configuration diagram of a system in a first embodiment of the present invention.

REFERENCE SIGNS LIST 10, 20: System
100: Wireless base station controller
101: Circuit switching network
102: IMS core network
110: Gateway device
120: IMS device
200: U-Plane gateway device
210: Flow controller
111, 115, 202, 204: U-Plane data communication unit
112, 201: Determination unit
113, 203: Protocol conversion unit
114, 211: Flow control signal transmission unit
205, 212: MEGACO communication unit

{DESCRIPTION OF EMBODIMENTS}

<First Embodiment>

FIG. 1 shows a system configuration of a first embodiment of the present invention. In a system 10 of the embodiment, a wireless base station controller 100 and a gateway device 110 are connected to each other via a circuit switching network 101. An IMS device 120 is connected to the gateway device 110 via an IMS core network 102 formed in an IP network.

An IMS-MGW (IMS media gateway) device may be used as the IMS device 120. The configuration of the IMS-MGW device is described in, for example, the non-patent document 2 using 3GPP, TS23.228 and TS29.163, and the like. The configuration of the IMS core network 102 is described in the non-patent document 1, TS23.228, and the like.

In the system 10 of the embodiment, AMR (Adaptive Multi-Rate) is used as a voice codec for voice call service. The AMR is described in the non-patent document 3 using 3GPP, TS26.071, and the like. In addition to the AMR, other voice codecs such as AMR-WB or AMR-WB+ can also be used. AMR-WB and AMR-WB+ are described in 3GPP TS26.190 and TS26.290, respectively.

The gateway device 110 receives a frame signal conforming to the protocol used in the circuit switching network 101 as user plane data from the wireless base station controller 100. As the protocol, for example, the IuUP (Iu User Plane) protocol can be used. The IuUP protocol is described in the non-patent document 4 using 3GPP, and the like.

Figure 2:
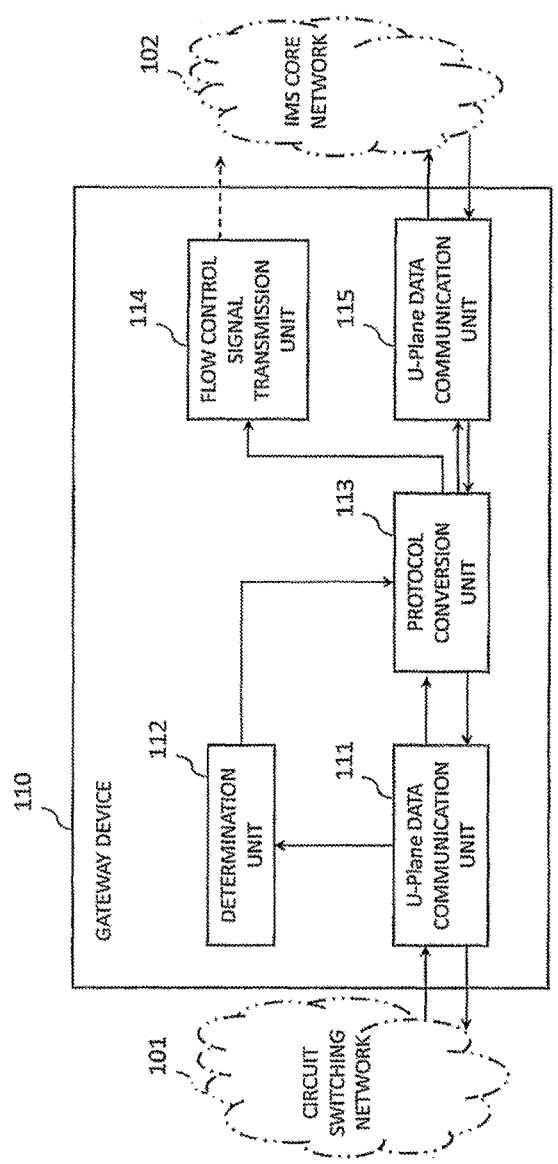
FIG. 2 is a block diagram of a gateway device in the first embodiment of the invention.

FIG. 2 shows the functional configuration of the gateway device 110. A U-Plane (User Plane) data communication unit 111 communicates a frame signal based on the IuUP protocol with the wireless base station controller 100 (FIG. 1) via the circuit switching network 101. A U-Plane data communication unit 115 communicates a frame signal based on the IuUP protocol with the IMS device 120 (FIG. 1) via the IMS core network 102.

A flow control signal transmission unit 114 generates a flow control signal corresponding to the frame signal received from the wireless base station controller 100, and transmits the flow control signal to the IMS device 120. A determination unit 112 determines whether the frame signal received from the wireless base station controller 100 satisfies a predetermined condition or not. When the received frame satisfies the predetermined condition, a protocol conversion unit 113 converts information included in the frame to information to be set in a flow control signal generated by the flow control signal transmission unit 114.

Figure 3:
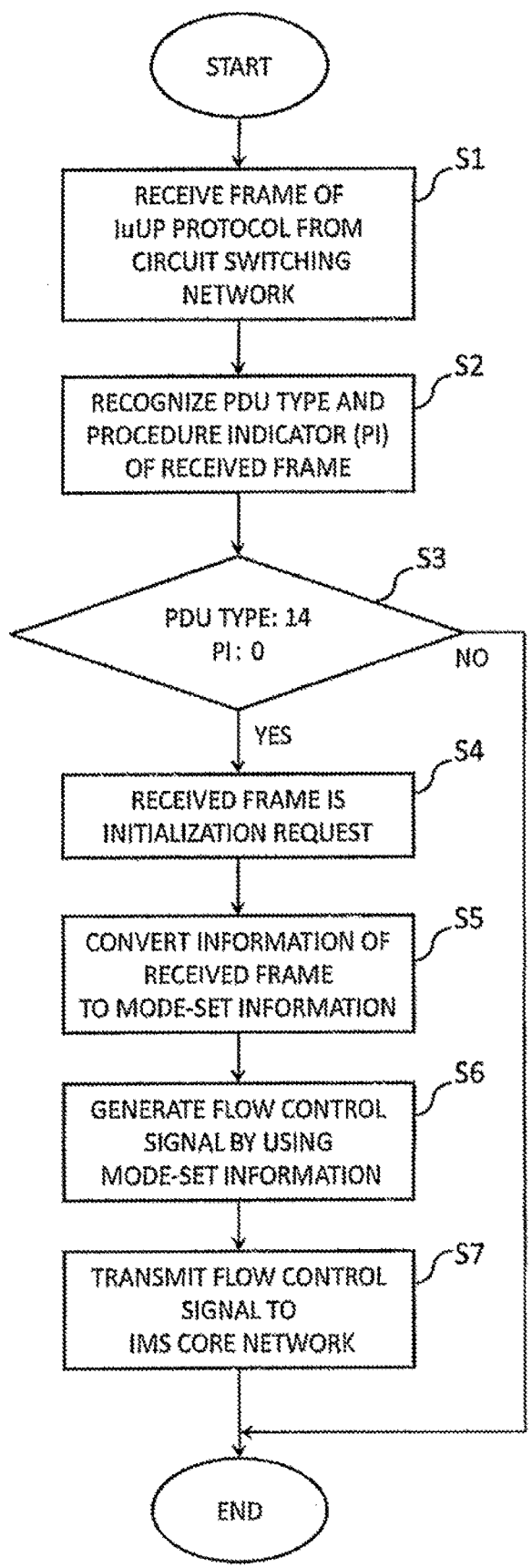
FIG. 3 is a flowchart showing an operation procedure of the first embodiment of the invention.

With reference to the flowchart of FIG. 3, the operation of the gateway device 110 with the above-described configuration will be described. The U-Plane data communication unit 111 receives a frame signal of the IuUP protocol transmitted from the wireless base station controller 100 via the circuit switching network 101 (step S1).

The determination unit 112 extracts PDU type information and procedure indicator information from the received frame. The determination unit 112 then determines whether the PDU type information is "14" out of "0", "1", and "14" or not, and also determines whether the procedure indicator information is "0" or not (step S2).

If the PDU type is "14" and the procedure indicator information is "0" as a result of the determination (YES in step S3), the protocol conversion unit 113 recognizes that the received frame indicates an IuUP protocol initialization request (step S4). The initialization request is a procedure for securing a necessary band in a signal path from the IMS core network 102 to the wireless base station controller 100.

In the case where the received frame is the initialization request, the protocol conversion unit 113 generates mode-set information conforming to AMR by using at least one of the following information pieces (1) to (3) included in the frame (step S5):

(1) the number (N) of RAB sub-flows in each of RFCI (Radio Access Bearer (RAB) sub-flow combination indicators) in signal paths used by the wireless base station controller 100, (2) the length of each of the N RAB sub-flows in the first RFCI, and (3) the length of each of the N RAB sub-flows in the second RFCI.

The mode-set information generated by using the above-described information is information to be set in the flow control signal generated by the flow control transmission unit 114. The mode-set information refers to a request on the AMR bit rate received from a device on the other side. That is, the mode-set information is information for instructing the IMS device 120 on the AMR bit rate to be applied to data transmission from the IMS device 120 to the wireless base station controller 100.

An example of the process in the protocol conversion unit 113 will now be described. The protocol conversion unit 113 generates the mode-set information based on a predetermined conversion table like the following TABLE 1.

TABLE 1

| AMR RFCI Example 1 | RAB sub-flows | | | Total size of bits/ RAB sub-flows combination | Source rate | mode-set |
|---|---|---|---|---|---|---|
| | RAB sub-flow 1 | RAB sub-flow 2 | RAB sub-flow 3 | | | |
| 2 | 42 | 53 | 0 | 95 | AMR 4.75 kbps | 0 |
| 3 | 49 | 54 | 0 | 103 | AMR 5.15 kbps | 1 |
| 4 | 55 | 63 | 0 | 118 | AMR 5.9 kbps | 2 |
| 5 | 58 | 76 | 0 | 134 | AMR 6.7 kbps | 3 |
| 6 | 61 | 87 | 0 | 148 | AMR 7.4 kbps | 4 |
| 7 | 75 | 84 | 0 | 159 | AMR 7.95 kbps | 5 |
| 8 | 65 | 99 | 40 | 204 | AMR 10.2 kbps | 6 |
| 9 | 81 | 103 | 60 | 244 | AMR 12.2 kbps | 7 |
| 1 | 39 | 0 | 0 | 39 | AMR SID | 8 |
| 0 | 0 | 0 | 0 | 0 | NO_DATA | 15 |

In this example, it is assumed that the protocol conversion unit 113 generates AMR mode-set information by using RFCI information extracted from a received frame, the number of RAB sub-flows in each of the RFCIs, and the length of each of the RAB sub-flows. The RFCI information is information for identifying the combination of sizes (lengths) of the RAB sub-flows, and corresponds to the information at the left-end column in TABLE 1 mentioned above.

Now, it is assumed that the RFCI information included in a received frame is "9", and the sizes of RAB sub-flow 1, RAB sub-flow 2, and RAB sub-flow 3 are "81", "103 and "60", respectively. In this case, "7" is obtained as the mode-set information corresponding to the information from the right-end column in TABLE 1. In the case where the RFCI information is "0" and each of the sizes of RAB sub-flows 1, 2, and 3 is "0", for example, "15" is obtained as the mode-set information from TABLE 1. The protocol conversion unit 113 supplies the obtained mode-set information to the flow control signal transmission unit 114.

The flow control signal transmission unit 114 sets the mode-set information from the protocol conversion unit 113 in a flow control signal to be transmitted to the IMS device 120 (step S6). As a protocol of the flow control signal, for example, an RTCP (RTP (Real-time Transport Protocol) Control Protocol) specified in IETF (Internet Engineering Task Force) RFC3551 can be used. An RTCP APP packet described in the non-patent document 5 may be applied as a packet of the flow control signal. The RTCP APP packet is a kind of RTCP packets which can be specified conforming to an application. By setting "204" in a packet type (PT) field of an RTP packet, it can be defined that the packet is an RTCP APP packet.

In the case of an RTCP APP packet, the flow control signal transmission unit 114 sets mode-set information from the protocol conversion unit 113 in a data storage field of the packet. The RTCP APP packet can be transmitted at any timing. The flow control signal transmission unit 114 generates an RTCP APP packet in which the mode-set information is set and, immediately, transmits it to the IMS device 120 (step S7).

According to the embodiment described above, a flow control adapted to the IMS core network 102 can be performed on the frame signal supplied from the circuit switching network 101 to the IMS core network 102. As a result, a multimedia service in the circuit switching network 101 can be provided in a proper state to an IMS.

The embodiment of the present invention is not limited to the above-described mode but can be appropriately changed within the scope of the claims. For example, a voice codec other than the AMR described above can be used. The IMS device 120 may be a device connected not to the IMS core network 102 formed in an IP network but to the IP network itself. In this case, the IMS core network 102 in FIG. 1 can be replaced with an IP network of a fixed network.

The information which is set in the flow control signal to the IMS device 120 is not limited to the mode-set information but may be another parameter such as CMR (Codec Mode Request) information. In this case, a packet format conforming to RFC3267 or RFC4867 is used and embedded with CMR information.

The gateway device 110 can receive the U-Plane data from the IMS device 120 via the IMS core network 102 and output the U-Plane data to the wireless base station controller 100 via the circuit switching network 101.

The determination unit 112 of the embodiment determines whether the received frame is the initialization request or not. The invention, however, is not limited to the embodiment. For example, the determination unit 112 may determine whether the received frame is a rate control request of the IuUP protocol or not. In this case, when the PDU type of the received frame is "14" and the procedure indicator information indicates "1", the frame is determined as the rate control request. The rate control request refers to a procedure for requesting control on the AMR bit rate in communication from the IMS core network 102 to the circuit switching network 101.

The present invention can be embodied as a computer program corresponding to the operation procedure (FIG. 3) of the gateway device 110 or a computer-readable medium in which the program is stored.

<Second Embodiment>

Figure 4:
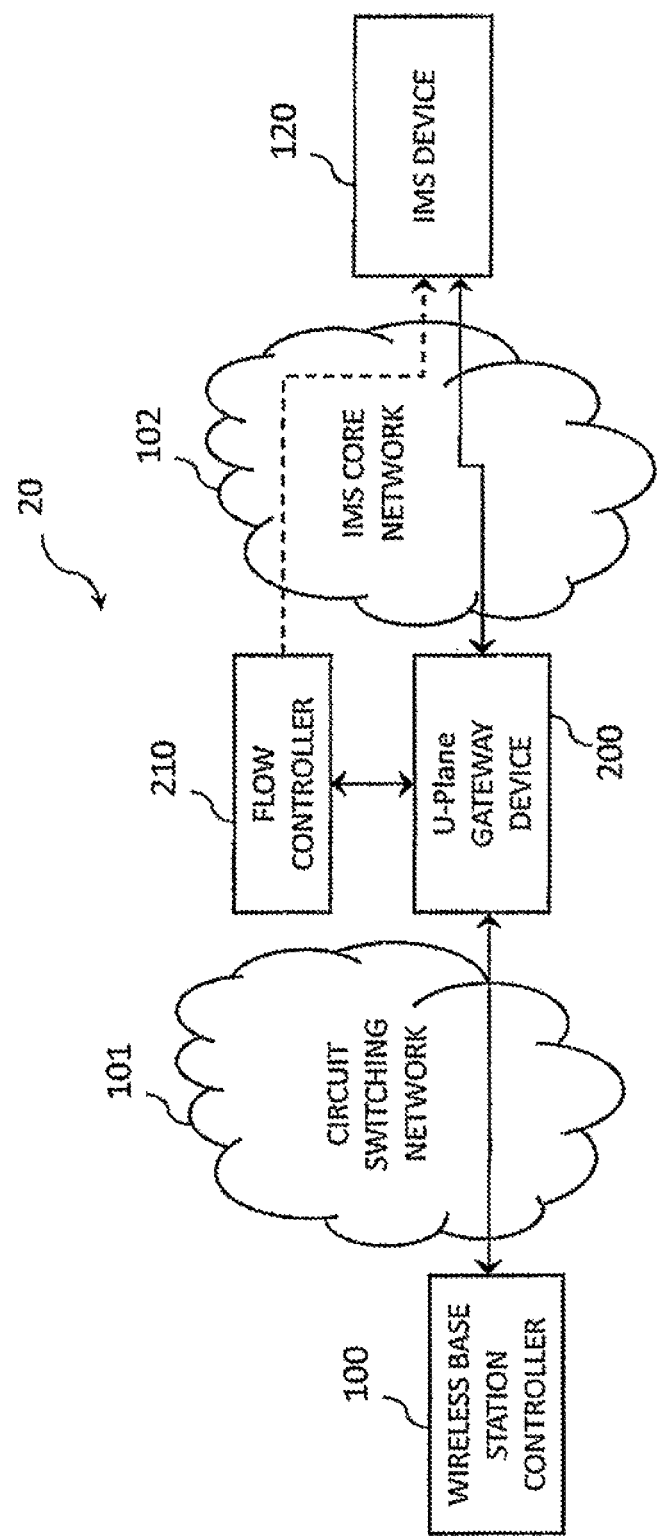
FIG. 4 is a configuration diagram of a system in a second embodiment of the invention.

FIG. 4 shows a system configuration of the second embodiment of the present invention. In a system 20 in FIG. 4, the same reference numerals are assigned to components similar to those of the foregoing embodiment (FIG. 1).

The flow control process and the U-Plane process in the technical field of the present invention are essentially of different properties. In the second embodiment, the system 20 in which the processes are executed by separate devices will be described. The system 20 has the configuration that the functions of the gateway device 110 of the foregoing embodiment are distributed to a U-Plane gateway device 200 and a flow controller 210.

Figure 5:
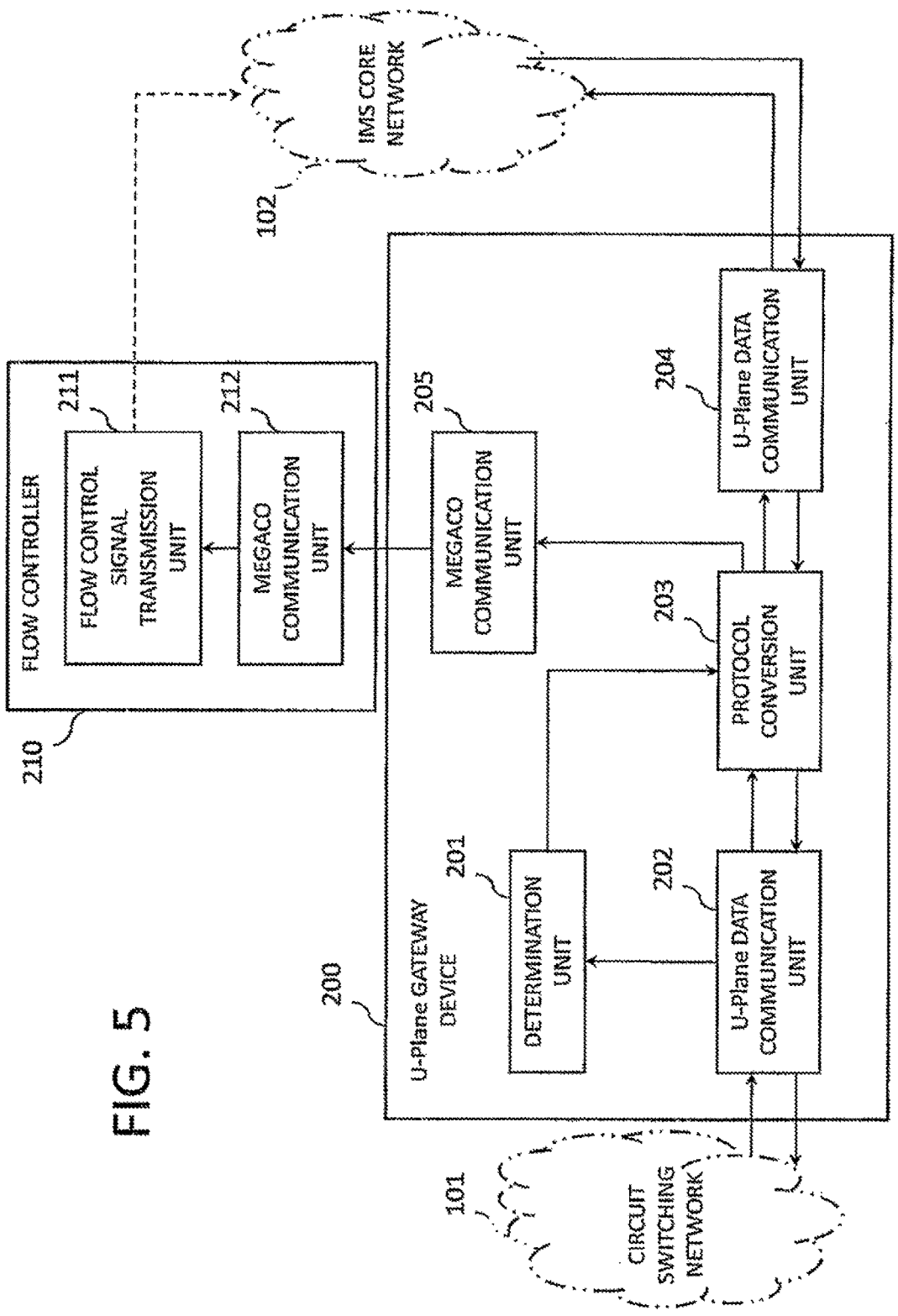
FIG. 5 is a block diagram of a U-Plane gateway device and a flow controller in the second embodiment of the invention.

FIG. 5 shows a functional configuration of the U-Plane gateway device 200 and the flow controller 210. In the U-Plane gateway device 200, a determination unit 201, a U-Plane data communication unit 202, a protocol conversion unit 203, and a U-Plane data communication unit 204 play functions similar to the determination unit 112, the U-Plane data communication unit 111, the protocol conversion unit 113, and the U-Plane data communication unit 115 in FIG. 2, respectively. The U-Plane data communication unit 202 corresponds to a first communication unit of the gateway device in the system of the present invention.

A flow control signal transmission unit 211 of the flow controller 210 has a function similar to that of the flow control signal transmission unit 114 (FIG. 2) of the gateway device 110.

In the system 20, the U-Plane gateway device 200 and the flow controller 210 are connected to each other so that they can communicate each other. In the second embodiment, an MEGACO (Media Gateway Control) specified in RFC3015 of IETF is used as a protocol for the connection. For the connection using the MEGACO, as shown in FIG. 5, the U-Plane gateway device 200 is provided with the MEGACO communication unit 205, and the flow controller 210 is provided with an MEGACO communication unit 212. The MEGACO communication unit 205 corresponds to a second communication unit of the gateway device in the system of the present invention.

The operation of the second embodiment is basically similar to that of the foregoing embodiment described with reference to FIG. 3. Specifically, when the U-Plane data communication unit 202 receives a frame of the IuUP protocol from the circuit switching network 101, the determination unit 201 checks the PDU type and the procedure indicator information of the frame. In the case where the PDU type is "14" and the procedure indicator information is "0" as a result of the check, the protocol conversion unit 203 generates the AMR mode-set information by using RFCI information of the received frame and the like.

The MEGACO communication unit 205 supplies the generated mode-set information together with transmission instruction information and the like on an MEGACO signal to the flow controller 210.

In the flow controller 210, when the MEGACO communication unit 212 receives the mode-set information from the U-Plane gateway device 200, the flow control signal transmission unit 211 sets the mode-set information as a flow control signal such as the RTCP APP packet described above. The flow control signal transmission unit 211 transmits the flow control signal to the IMS core network 102.

According to the second embodiment, the flow control process and the U-Plane process are executed by separate devices, so that an optimum device can be assigned to each process. This facilitates securing scalability (the width from small capacity to large capacity) of the system.

The second embodiment can be modified in a similar manner to the first embodiment. Further, the protocol for connecting the U-Plane gateway device 200 and the flow controller 210 is not limited to the MEGACO but may be any protocol such as SIP as long as it is adapted to the protocol of the flow control signal.

The invention claimed is:

1. A method of a gateway comprising:
receiving a frame signal conforming to an Iu User Plane (IuUP) protocol;
extracting PDU type information from the received frame signal;
extracting procedure indicator information from the received frame signal;
determining the PDU type of the received frame signal;
determining a value of the procedure indicator information of the received frame signal;
if the PDU is determined to be a certain type and the procedure indicator information is determined to be a certain value, then converting the protocol type from the received frame signal conforming to the IuUP protocol to a flow control signal conforming to a Real-time Transport Protocol Control Protocol (RTCP) for an IP Multimedia Subsystem (IMS); and
transmitting the flow control signal.

2. The method according to claim 1, wherein the gateway is a Media Gateway (MGW).

3. The method according to claim 1, wherein the frame signal is a rate control request.

4. The method according to claim 1, wherein the flow control signal applies a Real-time Transport Protocol (RTP) Control Protocol-Application (RTCP-APP) packet.

5. The method according to claim 1, wherein the flow control signal includes Code Mode Request (CMR).

6. The method of a gateway according to claim 1, wherein said converting between the frame signal conforming to the IuUP protocol and the flow control signal conforming to the RTCP for the IMS is performed by using a number of Radio Access Bearer (RAB) sub-flows.

7. The method of a gateway according to claim 1, wherein said converting between the frame signal conforming to the IuUP protocol and the flow control signal conforming to the RTCP for the IMS is performed by using a length of each of Radio Access Bearer (RAB) sub-flows in a first RAB Sub-Flow Combination Indicator (RFCI).

8. The method of a gateway according to claim 1, wherein said converting between the frame signal conforming to the IuUP protocol and the flow control signal conforming to the RTCP for the IMS is performed by using a length of each of Radio Access Bearer (RAB) sub-flows in a second RAB Sub-Flow Combination Indicator (RFCI).

9. The method of a gateway according to claim 1, wherein said converting between the frame signal conforming to the IuUP protocol and the flow control signal conforming to the RTCP for the IMS is performed by using a predetermined conversion table.

10. The method of a gateway according to claim 1, wherein the determining the PDU type of the received frame signal, determines if the PDU type information is of a PDU type 0, type 1, or type 14.

11. The method of a gateway according to claim 10, wherein said converting is performed only if the PDU type information is of a PDU type 14 and if the value of the procedure indicator information is equal to zero.

12. A gateway comprising:
a reception unit, implemented at least in hardware comprising a processor and memory, that receives a frame signal conforming to an Iu User Plane (IuUP) protocol;
a transmission unit, implemented at least in the hardware, that transmits a flow control signal;
a determination unit which extracts PDU type information and procedure indicator information from the received frame signal; wherein said determination unit being configured to determine the type of PDU and a value of the procedure indicator information received from the frame signal; and
a conversion unit, implemented at least in the hardware, that converts, if the PDU is determined to be a certain type and the procedure indicator information is determined to be a certain value, the protocol type from the received frame signal conforming to the IuUP protocol to the flow control signal conforming to a Real-time Transport Protocol Control Protocol (RTCP) for an IP Multimedia Subsystem (IMS).

13. The gateway according to claim 12, wherein the gateway is a Media Gateway (MGW).

14. The gateway according to claim 12, wherein the frame signal is a rate control request.

15. The gateway according to claim 12, wherein the flow control signal applies a Real-time Transport Protocol (RTP) Control Protocol-Application (RTCP-APP) packet.

16. The gateway according to claim 12, wherein the flow control signal includes Codec Mode Request (CMR).

\* \* \* \* \*